March 11, 1969
E. O. OHSOL
3,432,263
HIGH PRESSURE SULFURIC ACID PROCESS
Filed March 28, 1966
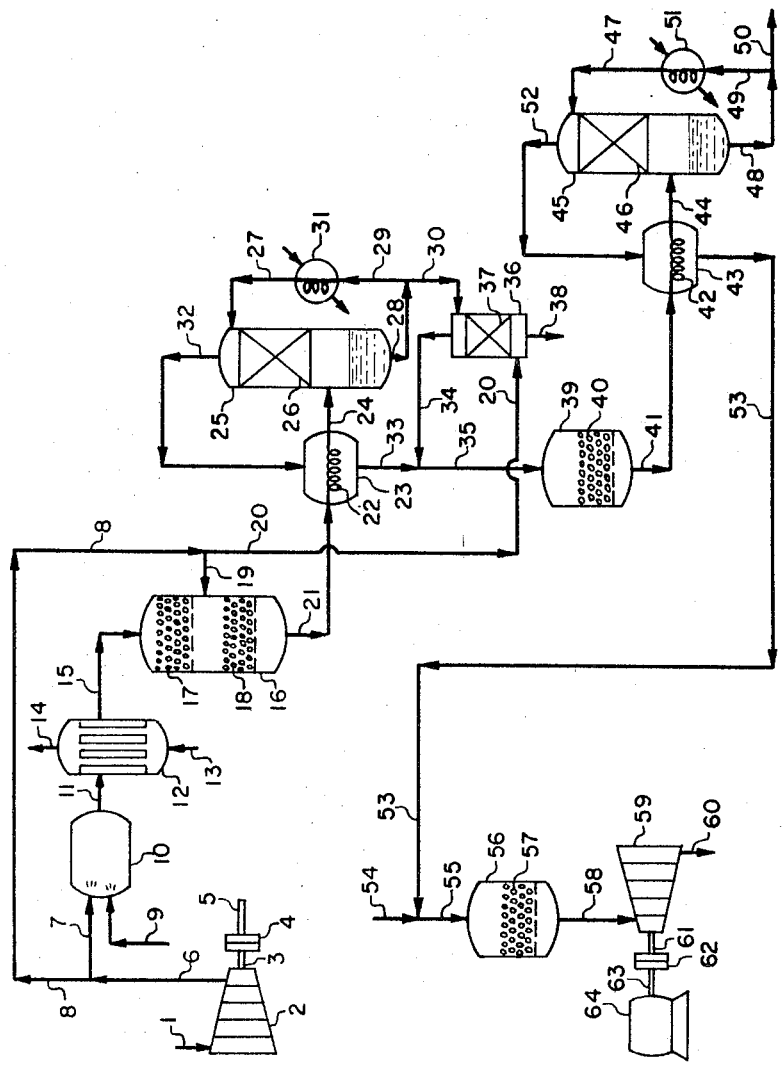
ERNEST O. OHSOL
INVENTOR.
BY J. T. Chaloty
AGENT

# United States Patent Office 3,432,263
Patented Mar. 11, 1969

3,432,263
HIGH PRESSURE SULFURIC ACID PROCESS
Ernest O. Ohsol, Wilmington, Del., assignor to Chemical Construction Corporation, New York, N.Y., a corporation of Delaware
Filed Mar. 28, 1966, Ser. No. 544,339
U.S. Cl. 23—168                                                    13 Claims
Int. Cl. C01b 17/78

ABSTRACT OF THE DISCLOSURE

A high pressure sulfuric acid process is provided, in which process air for sulfur combustion to sulfur dioxide is initially compressed, to provide a high pressure process gas which flows through the catalytic system and sulfur trioxide absorption at high pressure, with subsequent expansion of the residual gas through a power recovery turbine. The process includes multi-stage catalytic conversion at elevated pressure, with intermediate absorption of sulfur trioxide by scrubbing of the partially converted gas with concentrated sulfuric acid. The acid scrubbing solution also absorbs sulfur dioxide, which is removed from the product acid portion by stripping with air at elevated pressure. The resulting air stream containing desorbed sulfur dioxide values is added to the residual main process gas after the intermediate scrubbing step, and the combined gas stream is passed to further catalysis and final sulfur trioxide adsorption, followed by expansion of the residual gas through the power recovery turbine.

---

The present invention relates to the production of sulfuric acid. An improved processing sequence is provided, in which the entire process including sulfur trioxide absorption is carried out at elevated pressure, and the residual gas stream after absorption is expanded in power recovery means. The process involves greater recovery of useful power from the residual gas stream. In addition, when the catalytic oxidation of sulfur dioxide to sulfur trioxide is carried out in two stages with interstage scrubbing for removal of sulfur trioxide, an improved sequence is provided for removal and recovery of concomitantly absorbed sulfur dioxide.

Numerous procedures have been developed for the production of sulfuric acid, all of which involve the basic sequence of combustion of a sulfur-containing feed stream to form a gas stream containing sulfur dioxide, cooling of the gas stream to optimum temperatures, catalytic oxidation of sulfur dioxide to sulfur trioxide, and absorption of the sulfur trioxide in concentrated sulfuric acid to form further sulfuric acid. The sulfur-containing feed stream may consist of elemental sulfur, hydrogen sulfide, pyrites or other sulfides, or sludge acid derived from petroleum refining. Elemental sulfur is the preferred raw material for large-scale commercial facilities, however the other sulfur sources mentioned supra may also be employed within the scope of the present invention. The oxidation of sulfur dioxide to sulfur trioxide is generally carried out in the presence of a vanadium or platinum catalyst, however other catalytic agents known to the art may also be employed in suitable instances. The oxidation reaction is strongly exothermic. Consequently, in order to avoid overheating of the catalyst, the reaction is generally carried out in a plurality of stages of partial conversion, with cooling of the gas stream being provided between stages. In some instances, as for example the procedures of British Patents Nos. 904,982 and 956,049, the partially converted gas stream is scrubbed with liquid sulfuric acid solution between stages of conversion, in order to remove sulfur trioxide and thus increase the overall conversion and yield of the process.

In any case, the resultant fully converted sulfur trioxide-containing gas stream is then scrubber with concentrated sulfuric acid, either to form further sulfuric acid or oleum, which consists of sulfuric acid containing excess dissolved sulfur trioxide. Both of these alternatives are encompassed within the scope of the present invention.

Numerous alternatives and modifications of the basic process sequence have been proposed in the prior art. Among these modifications are procedures involving the practice of the catalytic conversion stage under elevated pressure, followed by expansion of the process gas stream to reduced or atmospheric pressure prior to absorption of sulfur trioxide. Processes of this nature are disclosed in U.S. Patents Nos. 1,883,570 and 2,075,075. In addition, the concept of recovering power from sulfur combustion at elevated pressure by expanding the hot sulfur dioxide-containing gas stream to reduced pressure is discussed in the magazine, "Chemical Engineering," vol. 67, No. 26, Dec. 26, 1960, at page 100. Finally, U.S. Patent No. 2,510,684 proposes the production of a mixed sulfur dioxide and trioxide-containing gas stream at elevated pressure which is cooled to condense liquid sulfur trioxide.

In the present invention, a sulfuric acid process is provided in which the combustion of a sulfur-containing feed stream to produce a sulfur dioxide-containing process gas stream, the catalytic conversion of the gas stream to sulfur trioxide, and the absorption of the sulfur trioxide in concentrated liquid sulfuric acid to form further sulfuric acid are all carried out under elevated pressure conditions, and the residual gas stream is expanded through mechanical power recovery means such as a gas turbine for the recovery of useful power, which may be employed in compressing process air for combustion of the sulfur-containing feed stream. In one embodiment of the invention, the residual gas stream is heated by heat exchange with the process gas passing to absorption, in order to recover additional power, and advantageously the residual gas stream may also be heated by the in situ burning of a fluid hydrocarbon such as methane in the gas stream. In another aspect of the invention, an improved sequence is provided for carrying out the catalytic oxidation of sulfur dioxide to sulfur trioxide in two stages at elevated pressure, with interstage scrubbing of the gas stream with liquid sulfuric acid to remove sulfur trioxide. The resulting liquid sulfuric acid contains dissolved sulfur dioxide, which is removed by contacting the liquid stream with a process air stream. The air stream, now containing evolved sulfur dioxide, is added to the main process gas stream between stages of catalytic conversion.

The process sequence of the present invention provides several important advantages. Since all of the principal stages of the process are carried out at elevated pressure, improved efficiency in terms of more complete catalytic conversion of sulfur dioxide to sulfur trioxide is attained, with the employment of less catalyst. The catalytic conversion is especially improved when it is carried out in two stages, with interstage absorption of sulfur trioxide, as described supra. In addition, carrying out the sulfur trioxide absorption stage under elevated pressure serves to enhance the efficiency and rate of sulfur trioxide absorption. Useful power is recovered when the residual gas stream is expanded in power recovery means, and the amount of power recovered is particularly significant when the residual gas stream is heated as described supra, prior to power recovery. Another advantage of the present invention is that recovery of purified product sulfuric acid by the scrubbing of the process gas stream with liquid sulfuric acid between stages of catalytic conversion is attained, even though the scrubbing liquid will dissolve substantial proportions of sulfur dioxide.

It is an object of the present invention to provide an improved process for the production of sulfuric acid.

Another object is to provide a process for the production of sulfuric acid in which the process steps are carried out at elevated pressure.

A further object is to provide a high pressure sulfuric acid process in which useful power is recovered from the process.

An additional object is to provide a high pressure sulfuric acid process in which an increased amount of useful power is recovered, for example in commercially available turbines without encountering erosion problems, from the residual gas stream after sulfur trioxide absorption, by heating the residual gas stream.

Still another object is to provide a high pressure sulfuric acid process with two stages of catalytic conversion, in which purified product sulfuric acid substantially free of sulfur dioxide is produced between stages by scrubbing the process gas stream between stages with liquid sulfuric acid, and contacting the resultant sulfur dioxide-containing sulfuric acid with an oxygen-containing gas.

These and other objects and advantages of the present invention will become evident from the description which follows. Referring to the figure, which is a flowsheet of a preferred embodiment of the present invention, the process oxygen-containing gas stream 1 usually consists of atmospheric air or oxygen-enriched air. Stream 1 has preferably been pre-dried by means not shown, such as by scrubbing with concentrated sulfuric acid, in order to prevent subsequent mist formation. The gas stream 1 is initially compressed in mechanical compression means 2, which usually consists of a centrifugal or reciprocating compressor and is driven by shaft 3, which is connected by coupling 4 to the shaft 5 of a power source such as a motor. The resulting high pressure oxygen-containing gas stream 6 discharged from unit 2 is typically at an absolute pressure in the range of 5 kg./sq. cm. to 50 kg./sq. cm., and an elevated pressure within this range is preferably maintained throughout the subsequent steps of catalytic oxidation of sulfur dioxide to sulfur trioxide and absorption of sulfur trioxide to form sulfuric acid. As an alternative to the pre-drying of stream 1, the compressed stream 6 may be dried, in order to reduce the size and cost of drying equipment such as a scrubbing tower.

Stream 6 is now divided into a major portion stream 7 to be employed in the combustion of a sulfur-containing feed stream, and a minor portion stream 8 which is also employed in the process as will be described infra. Stream 7 is now reacted with sulfur-containing feed stream 9 in combustion furnace 10, which is preferably maintained at a temperature below 1200° C. in order to prevent furnace deterioration and the formation of nitrogen oxides by the fixation of atmospheric nitrogen. As described supra, stream 9 may consist of any of a variety of sulfur-containing materials, however stream 9 will usually consist of elemental sulfur in large-scale commercial facilities. The resultant sulfur dioxide-containing gas stream 11 discharged from furnace 10 is preferably produced at a temperature in the range of 600° C. to 1200° C. Stream 11 usually contains in excess of 6% of sulfur dioxide content together with excess free oxygen, and will preferably contain in the range of 6% to 14% sulfur dioxide content by volume. In case a hydrogen-containing sulfur source is used in the furnace, stream 11 should be dried by scrubbing with sulfuric acid before further processing.

Stream 11 is now cooled to a reduced temperature suitable for subsequent catalytic oxidation of sulfur dioxide to sulfur trioxide. The cooling of stream 11 preferably takes place in boiler 12, with concomitant steam generation. Liquid water stream 13 is passed into unit 12, and the resultant generated steam is removed from unit 12 as stream 14. The cooled process gas stream 15 removed from unit 12 is at a reduced temperature usually above 350° C. and suitable for subsequent catalytic conversion, and is preferably at a temperature in the range of 350° C. to 550° C.

Stream 15 is now passed into catalytic converter 16, in order to oxidize a portion of the sulfur dioxide content of stream 15 to sulfur trioxide. Due to the provision of an elevated pressure typically in the range of 5 kg./sq. cm. to 50 kg./sq. cm. within unit 16, the catalytic oxidation reaction takes place at a faster rate and greater conversion to sulfur trioxide is attained. In most instances, a major portion of the sulfur dioxide will be catalytically oxidized to sulfur trioxide in unit 16. Unit 16 preferably contains two beds 17 and 18 consisting of a suitable catalyst for the oxidation reaction, such as platinum or vanadium oxide deposited on a suitable carrier. Each of the beds 17 and 18 is of a suitable volume to achieve only partial conversion, in order to avoid excessive temperature rise due to the exothermic nature of the reaction, which could result in catalyst deterioration. The oxygen-containing gas stream 8 is divided into streams 19 and 20, and stream 19 is passed into unit 16 between beds 17 and 18 so as to provide a quench-cooling of the hot partially converted gas stream. As an alternative or in order to provide additional cooling, cooling coils not shown may be provided in unit 16 between beds 17 and 18, with a suitable coolant such as water being circulated through the coils. In other instances, such as described in U.S. patent application No. 499,522 filed Oct. 21, 1965, now U.S. Patent No. 3,350,169, a partition may be provided in unit 16 between beds 17 and 18, with the hot process gas discharged from bed 17 being removed from unit 16 above the partition, externally cooled, and returned to unit 16 below the partition. In any case, the hot process gas stream 21 withdrawn from unit 16 now contains sulfur trioxide together with a proportion of unconverted sulfur dioxide.

Stream 21 is now cooled prior to absorption of its sulfur trioxide content by scrubbing with concentrated liquid sulfuric acid. The cooling of stream 21, preferably takes place in heat exchange with the resulting scrubbed gas stream free of sulfur trioxide, prior to catalytic oxidation of the residual sulfur dioxide content of the scrubbed gas stream to sulfur trioxide. Stream 21 is passed through coil 22 in heat exchanger 23, and the resulting cooled process gas stream 24 is produced at a temperature preferably below 200° C., and typically in the range of 50° C. to 200° C. Stream 24 is now passed into gas scrubbing tower 25, which may be provided with suitable internal means 26 for gas-liquid contact such as Raschig rings or other suitable packing, bubble cap trays, or sieve trays. Concentrated liquid sulfuric acid stream 27 is passed into unit 25 above section 26, and flows downward countercurrent to the rising gas stream. The sulfur trioxide is absorbed from the gas phase into the liquid stream in section 26 with consequent formation of further sulfuric acid or oleum. In addition, due to the provision of an elevated pressure typically in the range of 5 kg./sq. cm. to 50 kg./sq. cm. within unit 25, a substantial proportion of sulfur dioxide is dissolved into the liquid phase. The resultant liquid sulfuric acid phase containing dissolved sulfur trioxide and sulfur dioxide is withdrawn from unit 25 as stream 28, which is divided into recycle stream 29 and product stream 30. Stream 30 is processed for the removal of dissolved sulfur dioxide in a manner to be described infra, while stream 29 is cooled in heat exchanger 31 and recycled via stream 27.

The residual gas stream 32 withdrawn overhead from unit 25 is now substantially free of sulfur trioxide, however stream 32 contains sulfur dioxide and is passed to further catalytic oxidation. Stream 32 is heated in unit 23 to a suitable temperature for catalytic oxidation of sulfur dioxide to sulfur trioxide by heat exchange with stream 21. The resultant heated process gas stream 33 is preferably at a temperature in the range of 350° C. to 550° C., and is now combined with stream 34 to form stream 35. Stream 34 is derived from the contacting of concentrated sulfuric acid stream 30 containing dissolved sulfur dioxide with process air stream 20 in unit 36, which is provided with suitable gas-liquid contact means section 37. Section 37 may be similar to section 26 described supra, and thus consists of Raschig rings or other suitable packing, bubble cap trays, or sieve trays. The resultant gaseous stream 34 thus consists of an oxygen-containing gas stream which also contains sulfur dioxide removed from stream 30. The residual liquid phase stream 38 removed from unit 36 below section 37 consists of product concentrated sulfuric acid.

Stream 35 is now passed into catalytic converter 39, in order to oxidize substantially all of the sulfur dioxide content of stream 35 to sulfur trioxide. Due to the provision of an elevated pressure typically in the range of 5 kg./sq. cm. within unit 39, the catalytic oxidation reaction takes place at a faster rate and essentially complete conversion of sulfur dioxide to sulfur trioxide is attained. Unit 39 will usually contain one bed 40 of catalyst similar to beds 17 and 18 described supra. The hot gas stream 41 withdrawn from unit 39 now contains sulfur trioxide together with excess oxygen and inerts such as nitrogen, derived from stream 1 in instances when stream 1 consists of air or oxygen-enriched air.

Stream 41 is now cooled prior to absorption of its sulfur trioxide content by scrubbing with concentrated liquid sulfuric acid. The cooling of stream 41 preferably takes place in heat exchange with the resulting residual scrubbed gas stream free of sulfur trioxide, prior to utilization of the residual gas stream for power recovery by expansion through mechanical power recovery means. Stream 41 is passed through coil 42 in heat exchanger 43, and the resulting cooled process gas stream 44 is produced at a temperature preferably below 200° C., and typically in the range of 50° C. to 200° C. Stream 44 is now passed into gas scrubbing tower 45, which may be provided with suitable internal means 46 for gas-liquid contact, similar to section 26 described supra. Concentrated liquid sulfuric acid stream 47 is passed into unit 45 above section 46, and flows downward countercurrent to the rising gas stream. The sulfur trioxide is absorbed from the gas phase into the liquid stream in section 46 with consequent formation of further sulfuric acid or oleum. Due to the provision of an elevated pressure typically in the range of 5 kg./sq. cm. to 50 kg./sq. cm. within unit 45, the absorption of sulfur trioxide is rapidly and substantially completely attained. The resultant liquid sulfuric acid phase containing dissolved sulfur trioxide is withdrawn from unit 45 as stream 48, which is divided into recycle stream 49 and product concentrated sulfuric acid stream 50. Stream 49 is cooled in heat exchanger 51 and recycled via stream 47.

The residual gas stream 52 withdrawn overhead from unit 45 is now substantially free of sulfur trioxide and is at an elevated pressure typically in the range of 5 kg./sq. cm. to 50 kg./sq. cm. Stream 52 is thus suitable for power recovery by expansion through mechanical power recovery means. In this preferred embodiment of the invention, stream 52 is heated prior to expansion, in order to recover additional power. Thus, stream 52 is heated in unit 43 to a more highly elevated temperature, typically in the range of 350° C. to 550° C. The resulting heated gas stream 53 discharged from unit 43 may now be directly expanded for power recovery, however stream 53 is preferably further heated by in situ combustion of a fluid hydrocarbon stream 54, which is burned by reaction with the excess free oxygen in stream 53. Stream 54 preferably consists of methane, and the combined stream 55 may be sufficiently reacted for direct expansion, however stream 55 will preferably be passed into catalytic combustor unit 56 provided with catalyst bed 57 more complete reaction. Bed 57 will usually consist of platinized alumina or other suitable catalytic material for attaining complete hydrocarbon oxidation. The resulting hot gas stream 58, now at a temperature typically in the range of 500° C. to 700° C. and a pressure usually in the range of 5 kg./sq. cm. to 50 kg./sq. cm., is expanded through mechanical power recovery means 59, which will usually consist of a gas turbine or other suitable device for the recovery of power from gas expansion.

The resulting expanded and cooled gas stream 60, now usually at substantially atmospheric pressure, is discharged through a disposal stack, not shown. The shaft 61 of gas turbine 59 is connected by coupling 62 to the shaft 63 of a power consumer 64, which may consist of an electrical generator or other suitable device. As a preferred alternative embodiment of the invention, shaft 61 may be connected with shaft 3 of unit 2, so that unit 59 will provide power for operation of unit 2.

Numerous alternatives within the scope of the present invention will occur to those skilled in the art. Thus, the ranges of process variables such as pressure and temperature enumerated supra constitute preferred ranges of these variables for optimum utilization of the process concepts of the present invention, and the process is also operable outside of these ranges in suitable instances. The process as described supra entails partial catalytic conversion of sulfur dioxide to sulfur trioxide at elevated pressure, followed by a scrubbing step in unit 25 to absorb the sulfur trioxide and also dissolve sulfur dioxide, with further catalytic conversion of residual sulfur dioxide in the remaining gas stream to sulfur trioxide and a second scrubbing step. However, the process concepts of the present invention may also be extended to instances in which all of the sulfur dioxide is converted to sulfur trioxide prior to a single scrubbing step. In this case, all of the sulfur dioxide in stream 15 would be converted to sulfur trioxide in unit 16, all of the product concentrated sulfuric acid would be withdrawn as stream 30, units 36, 39, 43 and 45 and their functions would be omitted, and stream 33 would be utilized as stream 53. In many instances however, the conversion of only a portion of the sulfur dioxide in unit 16, followed by the scrubbing in unit 25 and final conversion in unit 39, will be carried out in practice. In addition, the concept of intermediate high pressure scrubbing in unit 25, with concomitant dissolving of sulfur dioxide into the liquid phase, followed by removal of the sulfur dioxide in unit 36, is an important sequence within the scope of the present invention, and is applicable in all instances where two stages of catalytic conversion are provided with intermediate scrubbing for sulfur trioxide removal. It will also be apparent that stream 34 may alternatively be recycled to the process by passing stream 34 into unit 16, either above bed 17 together with stream 15 or below bed 17 together with stream 19. The concept of power recovery by residual process gas expansion in mechanical power recovery means may be alternatively practiced by the expansion of streams 52, 53 or 55, instead of stream 58. It will be evident that if streams 52 or 53 are expanded to reduced pressure, stream 54 and unit 56 may be omitted. In some instances, stream 11 will be produced at a relatively low temperature suitable for direct catalytic conversion, and in such cases unit 12 and its function may be omitted. Stream 53 may alternatively be further heated, prior to expansion through unit 59, by passing stream 53 through unit 12. In this case, stream 13 would be omitted and the hot residual gas stream derived from unit 12 would be passed to unit 59, or alternatively to unit 56 for further heating. In some cases, stream 11 may be partially cooled by heat exchange with stream 53, followed by a further separate heat exchange with liquid water to produce steam.

An example of an industrial application of the process concepts of the present invention will now be described.

Example

The process sequence of the present invention was applied relative to a 1000 metric ton/day sulfuric acid plant, in which combustion of molten sulfur with air to produce sulfur dioxide, catalytic oxidation of sulfur dioxide to sulfur trioxide, and absorption of sulfur trioxide were carried out at elevated pressure. The pressure in unit 10 was 11.2 kg./sq. cm., and due to pressure drop through the system, the pressure of stream 58 was 9.85 kg./sq.cm. Stream 60 was discharged and passed to a disposal stack at substantially atmospheric pressure. The total power recovery in unit 59 was 15,000 horsepower. Following are the temperatures of the principal process streams.

| Stream No.: | Temperature, °C. |
|---|---|
| 15 | 370 |
| 21 | 400 |
| 24 | 91 |
| 32 | 67 |
| 33 | 377 |
| 35 | 370 |
| 41 | 388 |
| 44 | 91 |
| 52 | 67 |
| 53 | 370 |
| 58 | 590 |
| 60 | 150 |

I claim:

1. A process for the production of sulfuric acid which comprises compressing a first oxygen-containing gas stream in mechanical compression means, burning a sulfur-containing feed stream at elevated pressure with the compressed first oxygen-containing gas stream, whereby a process gas stream containing sulfur dioxide and excess free oxygen is produced at elevated pressure, passing said process gas stream through first catalytic conversion means for the oxidation of sulfur dioxide to sulfur trioxide, whereby a portion of the sulfur dioxide content of said process gas stream is converted to sulfur trioxide at elevated pressure, scrubbing the resulting sulfur trioxide-containing process gas stream at elevated pressure with a first stream of concentrated liquid sulfuric acid, whereby substantially all of the sulfur trioxide and a portion of the sulfur dioxide are absorbed into the liquid phase, dividing the resulting concentrated liquid sulfuric acid into a first portion and a second portion, recycling the first portion of said liquid sulfuric acid for further process gas scrubbing, contacting the second portion of said liquid sulfuric acid with a second oxygen-containing gas stream, whereby sulfur dioxide previously absorbed into the liquid sulfuric acid is transferred into said second oxygen-containing gas stream, withdrawing the residual second portion of liquid sulfuric acid as product sulfuric acid, combining the resulting sulfur dioxide-containing second oxygen-containing gas stream with the remaining process gas stream derived from said scrubbing with said first stream of concentrated liquid sulfuric acid, passing the combined gas stream through second catalytic conversion means for the oxidation of sulfur dioxide to sulfur trioxide, whereby substantially all of the sulfur dioxide content of said combined gas stream is converted to sulfur trioxide at elevated pressure, scrubbing the resulting sulfur trioxide-containing gas stream at elevated pressure with a second stream of concentrated liquid sulfuric acid, whereby substantially all of the sulfur trioxide content of said gas stream is absorbed into the liquid phase to form further sulfuric acid, and withdrawing a portion of said second stream of concentrated liquid sulfuric acid as product sulfuric acid.

2. The process of claim 1, in which said first and second oxygen-containing gas streams consist of air, and said sulfur-containing feed stream is molten liquid sulfur.

3. The process of claim 1, in which said process gas stream containing sulfur dioxide and excess free oxygen is cooled, prior to passing said process gas stream through said first catalytic conversion means.

4. A process for the production of sulfuric acid which comprises compressing a first oxygen-containing gas stream in mechanical compression means, burning a sulfur-containing feed stream at elevated pressure with the compressed first oxygen-containing gas stream, whereby a process gas stream containing sulfur dioxide and excess free oxygen is produced at elevated pressure, passing said process gas stream through first catalytic conversion means for the oxidation of sulfur dioxide to sulfur trioxide, whereby a portion of the sulfur dioxide content of said process gas stream is converted to sulfur trioxide at elevated pressure, scrubbing the resulting sulfur trioxide-containing process gas stream at elevated pressure with a first stream of concentrated liquid sulfuric acid, whereby substantially all of the sulfur trioxide and a portion of the sulfur dioxide are absorbed into the liquid phase, dividing the resulting concentrated liquid sulfuric acid into a first portion and a second portion, recycling the first portion of said liquid sulfuric acid for further process gas scrubbing, contacting the second portion of said liquid sulfuric acid with a second oxygen-containing gas stream, whereby sulfur dioxide previously absorbed into the liquid sulfuric acid is transferred into said second oxygen-containing gas stream, withdrawing the residual second portion of liquid sulfuric acid as product sulfuric acid, combining the resulting sulfur dioxide-containing second oxygen-containing gas stream with the remaining process gas stream derived from said scrubbing with said first stream of concentrated liquid sulfuric acid, passing the combined gas stream through second catalytic conversion means for the oxidation of sulfur dioxide to sulfur trioxide, whereby substantially all of the sulfur dioxide content of said combined gas stream is converted to sulfur trioxide at elevated pressure, scrubbing the resulting sulfur trioxide-containing gas stream at elevated pressure with a second stream of concentrated liquid sulfuric acid, whereby substantially all of the sulfur trioxide content of said gas stream is absorbed into the liquid phase to form further sulfuric acid and a residual high pressure gas stream is produced substantially free of sulfur oxides, withdrawing a portion of said second stream of concentrated liquid sulfuric acid as product acid, and expanding said residual gas stream to reduced pressure in mechanical power recovery means.

5. The process of claim 4, in which said residual gas stream is heated prior to expansion by heat exchange with said resulting sulfur trioxide-containing gas stream derived from passing said combined gas stream through second catalytic conversion means, prior to scrubbing said resulting sulfur trioxide-containing gas stream with said second stream of concentrated liquid sulfuric acid.

6. The process of claim 4, in which said mechanical power recovery means is connected with said mechanical compression means, and thereby serves to provide at least a portion of the power requirement for operation of said mechanical compression means.

7. The process of claim 4, in which a fluid hydrocarbon is burned in said residual high pressure gas stream, prior to expansion of said residual gas stream.

8. The process of claim 7, in which said fluid hydrocarbon comprises methane, and the burning of said methane is attained by means of catalytic combustion.

9. The process of claim 4, in which said oxygen-containing gas stream is air, and said sulfur-containing feed stream is molten liquid sulfur.

10. The process of claim 4, in which said process gas stream containing sulfur dioxide and excess free oxygen is cooled, prior to passing said process gas stream through said first catalytic conversion means.

11. The process of claim 4, in which said residual gas stream is heated prior to expansion by heat exchange with said process gas stream containing sulfur dioxide and excess free oxygen, prior to passing said process gas stream through said first catalytic conversion means.

12. The process of claim 4, in which said oxygen-containing gas stream is compressed to a pressure in the range of 5 kg./sq. cm. to 50 kg./sq. cm., said process gas stream containing sulfur dioxide and excess free oxygen is produced at a temperature in the range of 600° C. to 1200° C. and is cooled to a temperature in the range of 350° C. to 550° C. prior to passing through said first catalytic conversion means, said resulting process gas stream containing sulfur trioxide and sulfur dioxide derived from said first catalytic conversion means is cooled to a temperature in the range of 50° C. to 200° C. prior to said scrubbing with a first stream of concentrated liquid sulfuric acid, said remaining process gas stream derived from said scrubbing with said first stream of concentrated sulfuric acid is heated to a temperature in the range of 350° C. to 550° C. prior to passing through said second catalytic conversion means, said resulting sulfur trioxide-containing gas stream derived from said second catalytic conversion means is cooled to a temperature in the range of 50° C. to 200° C. prior to said scrubbing with concentrated liquid sulfuric acid by heat exchange with the residual gas stream produced after sulfur trioxide absorption, whereby said residual gas stream is heated to a temperature in the range of 350° C. to 550° C. prior to expansion, and the resulting heated residual gas stream is expanded to substantially atmospheric pressure.

13. The process of claim 12, in which said resulting heated residual gas stream is further heated to a more highly elevated temperature in the range of 500° C. to 700° C. by the burning of a fluid hydrocarbon in said gas stream, prior to expansion to substantially atmospheric pressure.

References Cited

UNITED STATES PATENTS

| 1,901,416 | 3/1933 | Schroeder | 55—73 |
| 2,075,075 | 3/1937 | Zeisberg | 23—167 |
| 3,142,536 | 7/1964 | Guth et al. | 23—175 |

FOREIGN PATENTS

| 467,298 | 6/1937 | Great Britain. |

OTHER REFERENCES

Fairlie: "Sulfuric Acid Manufacture" (1936), pp. 32–44 and 515, 516 relied on.

EARL C. THOMAS, *Primary Examiner.*

ARTHUR GREIF, *Assistant Examiner.*

U.S. Cl. X.R.

23—175